United States Patent [19]
Ruehle et al.

[11] 4,268,012
[45] May 19, 1981

[54] ADJUSTABLE LENGTH STRAP TIE DOWN APPARATUS

[76] Inventors: Walter J. Ruehle, 14000 E. Progress Way, Denver, Colo. 80232; Robert E. Bronson, 710 Holly, Denver, Colo. 80220

[21] Appl. No.: 67,767
[22] Filed: Aug. 20, 1979
[51] Int. Cl.³ .......................... B65D 67/02; B60P 7/10
[52] U.S. Cl. ..................................... 254/223; 24/71.2
[58] Field of Search ............... 254/223, 217, 218, 357, 254/376; 24/71.2, 71.3, 68 CD, 68 R; 410/103, 100, 37

[56] References Cited
U.S. PATENT DOCUMENTS

| | | | |
|---|---|---|---|
| 2,889,136 | 6/1959 | Prete, Jr. ............................. | 254/218 |
| 2,993,680 | 7/1961 | Davis ................................. | 24/71.2 X |
| 3,180,623 | 4/1965 | Huber ............................... | 24/71.2 X |
| 3,826,473 | 7/1974 | Huber ............................... | 24/71.2 X |
| 4,155,537 | 5/1979 | Bronson ........................... | 254/223 X |

Primary Examiner—John M. Jillions
Attorney, Agent, or Firm—Bruce G. Klaas; Richard D. Law; Dennis K. Shelton

[57] ABSTRACT

Apparatus for holding a first object or objects in a fixed position relative to a second object comprising an elongated continuous length strap for engaging and holding the first object; strap attachment apparatus connected to opposite ends of the strap for attaching the strap to the second object; winch-type strap tightening apparatus operatively associated with an intermediate loop portion of the strap for adjustably tensioning the strap; the winch-type strap tightening apparatus comprising a rotatable split shaft assembly for winding and unwinding the strap to adjustably tension the strap defining a slot for receiving an intermediate, variable length loop portion of the strap to enable adjustment of the effective length of strap; ratchet apparatus associated with the shaft assembly for releasably holding the shaft against unwinding rotation during and after tensioning of the strap; a one piece frame member for supporting the shaft assembly and the ratchet apparatus; and the split shaft assembly comprising a pair of elongated members having an arcuate cross-sectional configuration held in radially spaced relationship by a spacer device at one end and arcuate slots in the ratchet apparatus at the other end.

11 Claims, 7 Drawing Figures

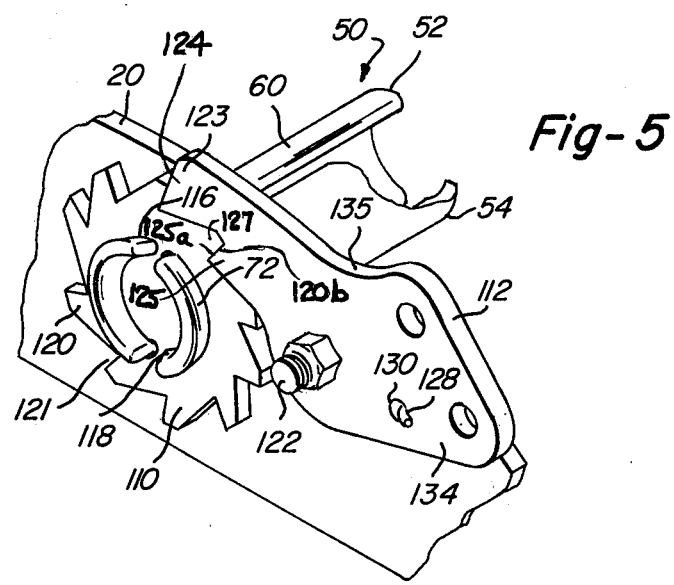
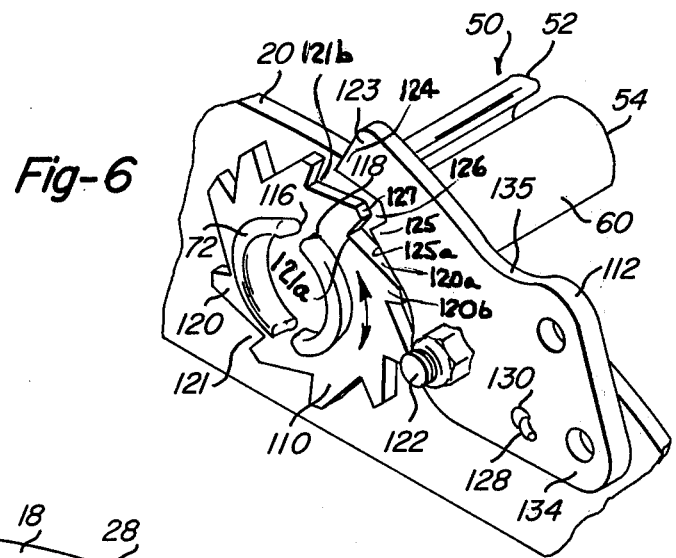
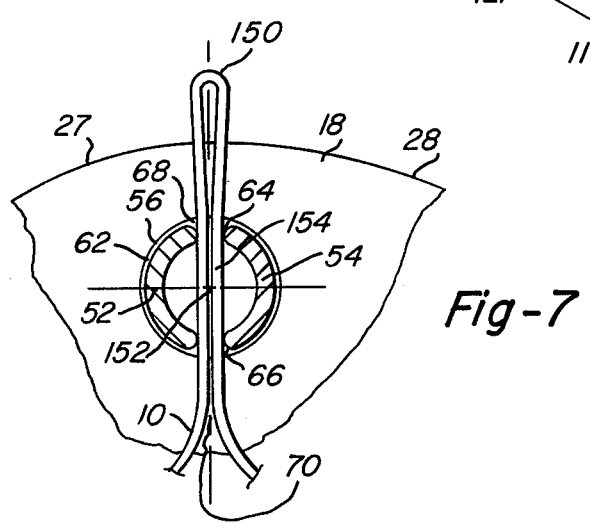

ADJUSTABLE LENGTH STRAP TIE DOWN APPARATUS

BACKGROUND AND SUMMARY OF THE INVENTION

This invention relates generally to tie down apparatus for securing first objects to second objects and, more particularly, to adjustable length strap tie down apparatus for securing various types of loads and objects, on various types of vehicles and trailers. While the apparatus of the present invention has unlimited applications and uses, the apparatus is particularly useful for securing objects and loads, such as boats, motorcycles, snowmobiles, luggage, lumber, furniture and the like, on trailers, the roofs or roof top carriers of automobiles, pickup trucks and other truck beds, and the like.

The present invention relates to improvements of the apparatus of prior U.S. Pat. No. 4,155,537, the disclosure of which is specifically incorporated herein by reference.

In general, the apparatus of the present invention comprises a continuous one piece strap means of rectangular cross-section of any desired length made of flexible, high strength, soft finish, weather resistant, tensionable webbing material, such as used for vehicle safety belts, with multiple purpose attachment means fixedly secured to opposite ends of the strap means and operatively associated with winch-type tensioning apparatus of new and improved design in a new and improved manner enabling adjustment of the effective length of the strap means as necessary or desirable. More specifically, the present invention comprises an elongated one piece frame means having a pair of elongated spaced parallel side wall portions for mounting a rotatable shaft means. Rotatable shaft means comprising a pair of split elongated shaft members of arcuate segmental cross-sectional shape are rotatably mounted in the frame side wall portions and spaced from one another to define strap slot means with opposite end portions extending through and rotatably supported in the elongated parallel frame side wall portions. A ratchet means has a ratchet wheel member mounted on one juxtapositioned pair of the opposite end portions of the split shaft members and a pawl member mounted on the adjacent one of the frame side wall portions. An elongated operating handle means, in the form of an elongated operating handle member, is slidably mounted on the other juxtapositioned pair of the opposite end portions of the split shaft members adjacent the other of the frame side wall portions.

Mounting means for the shaft means and the ratchet means comprise a cylindrical bore in each of the side wall portions having a radius approximately equal to the radius of the arcuate outer surface of each of the split shaft members, the bores being coaxial. A pair of circumferentially spaced arcuate concentric slots are provided in the ratchet wheel member with radii approximately equal to the radii of the arcuate inner and outer surfaces of the split shaft members and being coaxial therewith. An end portion of each split shaft member is drivably received in and confined and held in spaced relationship by one of said arcuate slots. Radially extending flange means are provided on each end portion of each split shaft member for limiting axial displacement of the split shaft members relative to the ratchet wheel member and for holding the ratchet wheel member on and in drivable relationship with the split shaft members between the flange means and the adjacent side surface of one of the frame side wall portions. A spacer means, having a radially extending opening therein, is mounted between the opposite end portions of the split shaft members for holding the opposite end portions in uniformly spaced coplanar relationship with the arcuate slots and has a radial extending abutment surface for abutting engagement with the adjacent side surface of the other one of the frame side wall portions to limit axial displacement of the split shaft assembly. An elongated handle member is slidably mounted in and extends through aligned radially extending bores in the opposite end portions of the split shaft members and through the radially extending opening in the spacer means to limit relative axial displacement between the spacer means and the split shaft members. Retaining means are provided on opposite end portions of the handle member for preventing removal of the handle member from the aligned bores in the split shaft members.

BRIEF DESCRIPTION OF DRAWING

A presently preferred and illustrative embodiment of the invention is shown in the accompanying drawing in which:

FIG. 5 is a perspective view of another portion of the apparatus of FIGS. 1-3;

FIG. 6 is a perspective view of the portion of the apparatus of FIG. 5 in another operative position; and FIG. 7 is a cross-sectional view of a portion of the apparatus of FIG. 1 taken along the line 7—7.

DETAILED DESCRIPTION

Figure 1:
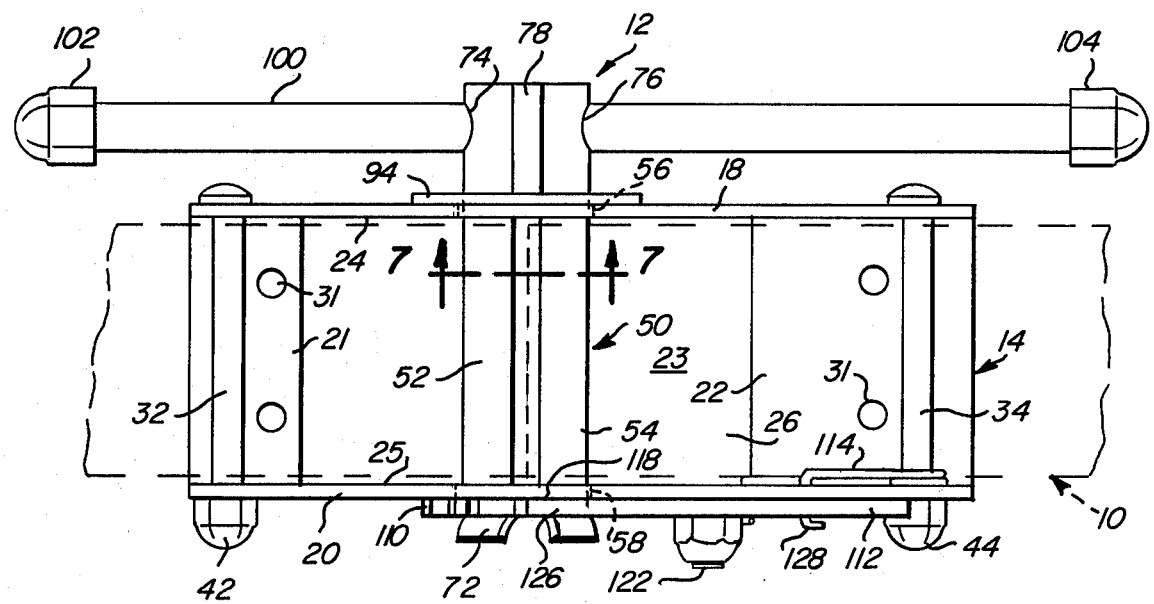
FIG. 1 is a plan view of a presently preferred and illustrative arrangement of apparatus of the invention.
Figure 2:
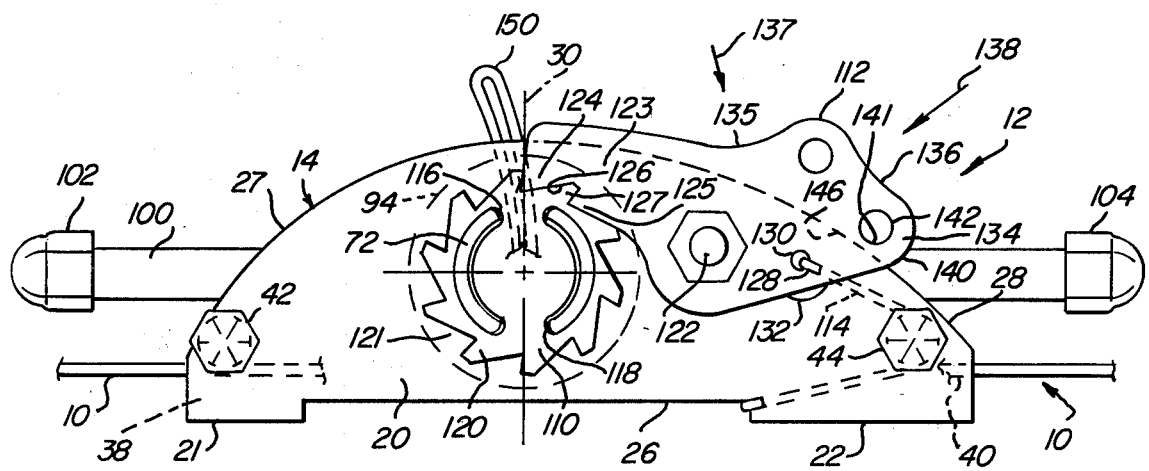
FIG. 2 is a side elevational view of winch-type tightening apparatus shown in FIG. 1.

In general, as shown in FIGS. 1 and 2, the invention comprises an elongated continuous length strap means 10 for engaging and securing a first object or objects such as, for example, a boat, (not shown) relative to a second object, such as, for example, a boat trailer (not shown). The strap means is provided with attachment means (not shown), at opposite ends thereof for attaching the opposite ends to, or around, the second object. A winch-type tightening means assembly 12 is operatively associated with the strap means to adjustably tension the strap means between the attachment means and thereby hold the strap means in taut engagement with the first object and secure the first object to the second object.

The strap means 10 is made of one continuous length of conventional flat, flexible, high strength, wear and weather resistant, woven, web-type, material such as nylon, having a rectangular cross-sectional configuration defined by spaced, parallel, relatively wide (e.g., 1 1/2 inch), flat top and bottom surfaces and spaced, parallel relatively narrow-width edge surfaces. The woven web type material preferably has a high tensile strength of, for example, 2500 lbs. and preferably has a relatively soft outer finish. The attachment means are preferably in the form of conventional S hook members having a closed loop portion, permanently secured to a folded over and sewn end portion of the strap, and an open loop portion enabling attachment to various devices in various ways such as to themselves, other S hooks, eyelet type members, spaced support members of objects or to adjacent portions of the strap means as described in detail in U.S. Pat. No. 4,155,537.

Figure 3:
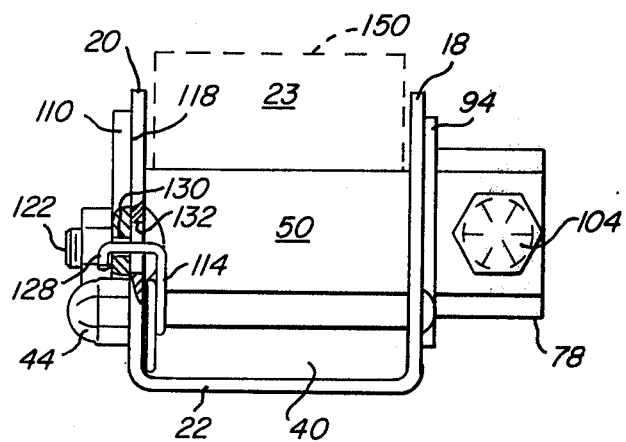
FIG. 3 is an end view of the apparatus of FIGS. 1 and 2.

The winch-type tightening means assembly 12 comprises an elongated rigid frame means 14 of channel shape cross-section made from one piece of flat sheet metal which may be drilled and slotted prior to forming into the shape shown in FIGS. 1-3. The frame means 14 comprises a pair of spaced, parallel, elongated side wall portions 18, 20 connected at opposite ends by transversely extending relatively narrow width and relatively wide width connecting web portions 21, 22, to define an elongated cavity 23 between the side wall portions for receiving and supporting the strap therebetween. The width of the cavity 23, as measured between inner side surfaces 24, 25 of side portions 18, 20 is sufficiently larger than the width of the strap, so that the strap is nestable therewithin while being guidably movable between the inner side surfaces. An elongated slot 26 is provided between web portions 22, 24 to provide space for the strap when it is wound into a roll. Each sidewall portion has a curved upper surface comprising a relatively small radius portion 27 and a relatively large radius portion 28 which have a point of tangency at center line 30 which is longitudinally offset relative to the longitudinal midpoint of the frame means 12 and coincident with the longitudinal midpoint of slot 26. Web portions 21, 22 may be provided with openings 31 to enable fastening of the frame means 12 to a support surface by suitable fastening devices. Pin members 32, 34 are mounted in aligned holes (not shown) in side portions 18, 20 in upwardly spaced relationship to web portions 22, 24 to define strap receiving slots 38, 40. The pin members have a circular cross-sectional configuration to facilitate movement of the strap thereunder and are fastened by frictionally retained expandable cap nuts 42, 44.

Figure 4:
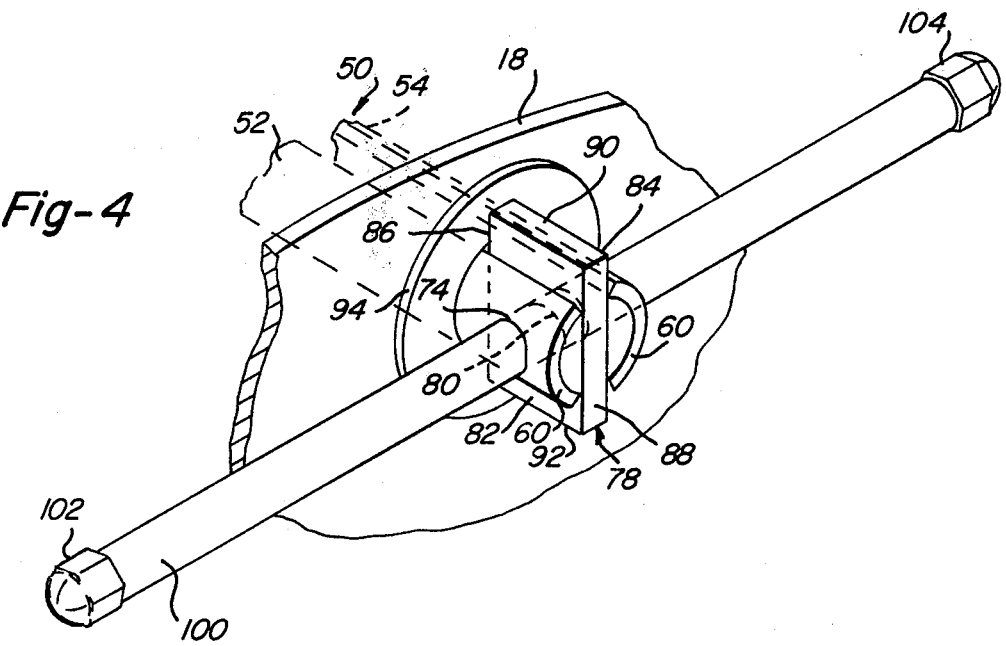
FIG. 4 is a perspective view of a portion of the apparatus shown in FIGS. 1-3.

The winch-type means assembly 14 further comprises a rotatable shaft means 50, in the form of a pair of shaft members 52, 54 rotatably supported in aligned circular openings 56, 58 in the side portions 18, 20 and extending transversely therebetween across the cavity 23 between rod members 32, 34. Each of the shaft members 52, 54 comprises an elongated portion 60 of generally segmental arcuate cross-sectional configuration, as shown in FIG. 7, with an arcuate length of approximately 150° and an outer peripheral surface 62 having a radius approximately equal to the radius of openings 56, 58 for rotatable supporting engagement with the surfaces of those openings. The side surfaces 64, 66 of segmental portions 60 are preferably rounded and, in the assembled position, are located in equal circumferentially spaced relationship to define 180° oppositely located strap slots 68, 70. An end portion of relatively short axial length is radially outwardly flared to provide a slightly radially outwardly enlarged head portion 72 for a purpose to be hereinafter described. Radially extending and aligned openings 74, 76 are provided in the opposite end portions of the shaft members. A spacer means 78 of suitable thickness and material, such as plastic or metal, having a central opening 80 which is radially alignable with shaft openings 74, 76 holds the opposite end portions of the shaft members in radially spaced relationship. In the presently preferred embodiment, FIG. 4, spacer means 78 has a polygonal shape defined by flat opposite parallel side surfaces 82, 84, radially extending axially facing flat parallel end surfaces 86, 88, and axially extending flat parallel end surfaces 90, 92. A bearing washer member 94 made of suitable material, such as nylon plastic, is mounted on the shaft members between the inner end surface 86 of the spacer block member 78 and the side surface of wall portion 18.

A crank handle means, in the form of an elongated rod member 100, is operatively connected to the shaft means 50 for causing rotation thereof. The rod member 100 is slidably supported in the aligned openings 74, 76 in the shaft end portions and the opening 80 in spacer member 78. Expandable friction type cap nuts 102, 104 are mounted on the ends of rod member 100 to prevent removal of the rod member during use of the apparatus. The length of rod member 100 is such as to provide sufficient mechanical advantage to properly tension the strap.

Ratchet means, in the form of a ratchet wheel member 110, a ratchet pawl lever 112, and a spring member 114, are provided to releasably hold the shaft means against unwinding rotation during and after tightening of the strap. The ratchet wheel member 110 has a pair of concentric arcuate segmental shaped slots 116, 118 therethrough for receiving portions of the shaft members axially next adjacent the enlarged shaft end portions 72 with side surface 118 movably abutably supported by the outer side surface of wall portion 20. Slots 116, 118 are positioned and sized to permit passage of the radially expanded shaft end portions when the shaft members are titled relative to the central axis of openings 56, 58 during assembly therethrough prior to placement of spacer member 78 between the opposite end portions, and to provide an abutment surface adjacent each slot engageable with the enlarged head portions after assembly to prevent relative axial movement between the ratchet wheel and the shaft members. Rod member 100 is then inserted through openings 74, 76, 80 and cap nuts 102, 104 are applied to complete the assembly and hold the shaft members in the assembled portion. Suitable ratchet teeth 120 and slots 121 are uniformly provided on the periphery of the ratchet wheel. The ratchet lever 112 is pivotally movably mounted on the outer side surface of side wall portion 20, by a nut and bolt assembly 122 fixedly secured to the plate member 34, for movement between an engaged position (FIGS. 2 and 5) and a disengaged position (FIG. 6) relative to the ratchet wheel. A radially outermost dog portion 123 of the lever 112 is constructed and arranged to engage the teeth and slots on the periphery of the ratchet wheel and in the engaged position, to prevent strap unwinding clockwise rotation of the shaft means while permitting strap winding counterclockwise rotation thereof. A pair of ratchet teeth 124, 125 spaced by a slot 126, FIG. 6, which have a size and shape corresponding to the ratchet wheel teeth and slots 120, 121, are provided on the lower outer end surface of dog portion 123 so that, in the engaged position, one ratchet wheel tooth 127 is fully seated in the pawl slot 126 and the pawl teeth 124, 125 are fully seated in adjacent ratchet wheel slots.

The construction and arrangement of the ratchet wheel 110 and the pawl lever 112 is such that, during counterclockwise winding rotation of the ratchet wheel, the pawl lever is pivotally outwardly displaced in a clockwise direction about pivot 122 against the bias of spring 114 by cam action between the ratchet wheel teeth 120 and the elongated lower surface 125a of the radially innermost pawl tooth 125 as illustrated in FIG. 6. The pawl lever 112 is returned toward the engaged position by counterclockwise pivotal movement caused by the return spring 114. During the return movement, elongated lower intermediate pawl surface 125a first engages the outermost portion of ratchet wheel elongated tooth surface 120a, as illustrated in FIG. 6, and these surfaces are gradually fully engaged as pawl tooth 125 moves into ratchet wheel slot 121a, ratchet wheel tooth 127 moves into pawl slot 126, and pawl tooth 124 moves into ratchet wheel slot 121b. Pawl tooth 125 becomes fully seated in ratchet wheel slot 121a before ratchet wheel tooth 127 becomes fully seated in pawl slot 126 and ratchet wheel tooth 127 becomes fully seated in pawl slot 126 before pawl tooth 124 becomes fully seated in ratchet wheel slot 121b. Thus, during continuous counterclockwise windup rotation of shaft means 50, the pawl teeth 124, 125 are not fully seated in the ratchet wheel slots 121. When counterclockwise windup rotation is terminated and as pawl tooth 125 becomes fully seated in ratchet wheel slot 121a, a clockwise force is applied through pawl surface 125a on ratchet wheel surface 120a tending to cause clockwise rotation of ratchet wheel 110 to cause the pawl tooth 125 to be fully seated in ratchet wheel slot 121a with adjacent transverse tooth surfaces 120b and 125a, FIG. 5, in abutting engagement. Clockwise unwinding force on the ratchet wheel is transferred through tooth surface 120b to tooth surface 125a in a direction beneath the pivot axis 122 such as to cause slight further counterclockwise pivotal movement of pawl 112 resulting in full sequential seating of pawl teeth 125 and 124 in ratchet wheel slots 121a and 121b, respectively. In the fully seated position, the radially outermost end portion of pawl tooth 124 is located along ratchet wheel center line 30, as illustrated in FIG. 2, to provide maximum leverage against clockwise unwinding movement of ratchet wheel 110 while ratchet wheel tooth 127 continues to exert a force on pawl 110 through pawl tooth 125 in a direction located below pivot 122 to continue to bias the pawl 112 in a counterclockwise pivotal movement direction and prevent clockwise pivotal movement of pawl 112. In this manner, the engagement between the ratchet wheel and the pawl lever is more positive and there is less likelihood of premature disengagement. The torsion spring member 114 is mounted on pin member 34 with one end portion 128 extending through aligned openings 130, 132, FIG. 3, in the ratchet wheel and the wall portion 20 respectively, to engage an actuating portion 134 of the lever 112 to bias the lever toward the engaged position while permitting release of the lever during strap winding and movement to the disengaged position by manually applied force on curved upper surfaces 135 or 136 of the actuating portion in the direction of arrows 137 or 138, FIG. 2. Surface 135 is contoured to accommodate the thumb or finger of a person. Such applied force on the actuating portion disengages dog portion 126 from slots 122 with the movement of the actuating portion being terminated by abutment of end portion 140 with cap nut 44. A lower side surface 141 of a first opening 142 is tangent with the curved upper surface 144 of wall portion 20 in the engaged position to enable insertion of a pin or pad lock bolt or the like to hold the lever in the engaged position.

If necessary or desirable, a second ratchet means of the same design and construction as the illustrated ratchet means may be mounted on the other end of the shaft means 50 in location of bearing washer 94. If a second ratchet means is used, the pawl levers 112 are preferably connected by a cross pin (not shown) mounted in openings 146 in each lever. In addition, a single ratchet means may be so located in place of the illustrated arrangement by providing a spacer block and pin between the opposite ends of the shaft members adjacent the enlarged head portions 72.

The winch-type tightening means assembly 16 can be made of any suitable rigid material, such as, for example, steel, which is preferably rust resistant or is provided with a rust resistant coating.

In order to operatively connect the strap means to the winch-type tightening means assembly, an intermediate portion of the strap means is folded over on itself to provide an intermediate loop portion 150 (FIG. 7) formed of two juxtapositioned strap layers 152, 154. The loop portion 150 is then inserted through the slot means 68, 70 of the shaft means 50. The loop portion may be of any desirable length and the length of the loop portion may be adjusted as necessary or desirable by pulling more or less of the loop portion through the slots. After the loop portion is located in the slot means, rotation of the shaft means 50 in one direction causes the strap means to be wound thereon and rotation of the shaft means in the opposite direction causes unwinding therefrom.

While the strap means and the winch-type tightening means may be separated and separately stored when not in use, more preferably, the length of the cavity 23 between rod members 32, 34 is sufficiently long to enable the strap means to be substantially completely wound onto the shaft means 50 for storage and ease of handling when not in use.

In use of the apparatus, an effective length of the strap means, i.e., those portions of the strap means which do not form part of the intermediate loop portion 150 and extend between the shaft means 50 and the attachment means, is adjusted by varying the length of the loop portion until a desired effective length of the strap means is established, the effective length being preferably slightly larger than the length required to engage and hold the particular object to be retained in the tightened position. In forming the effective length, the loop portion may be formed at any desired location along the length of the continuous strap means. Then, with the opposite ends of the strap means suitably connected to or associated with a fixed object and the strap means extending loosely across the object or load to be secured and the shaft member in an unwound position, the loop portion 150 may be pulled through the slot means until substantially the desired effective length of the strap means has been established. Among the various possible ways of connecting or associating the opposite ends of the strap means with the fixed or supporting object are attachment to (1) any fixed device such as a rail, beam, eyelet, rod, etc.; (2) to one another with portions of the strap means next adjacent thereto extending around some fixed object such as a rail or beam or bed of a truck etc., and (3) to an adjacent portion of the strap means which has been looped around some fixed object such as a rail or beam, etc. After the approximate effective length of the strap means has been established, only a relatively small length of the strap means need be wound on the shaft means to achieve the desired tensioning of the strap so as to minimize reduction of the relatively high mechanical advantage, provided by the relatively long rod member 100 and the relatively small diameter shaft means. The shaft means is then rotated by appropriate manual manipulation of rod member 100 to wind the loop portion around the shaft means as the strap means is concurrently wound on the loop portion. Preferably, at least a 4 inch length loop portion is initially provided to absorb forces imposed on the taut strap.

As the strap is wound on the shaft means, the dog portion 126 of the ratchet lever 112 engages with slots 122 of the ratchet wheel member 110 and is held in engagement by abutting relationship with teeth 120. In this engaged position, the tension on the strap is maintained and may only be increased by rotation of the shaft means as aforedescribed. To release the tension on the strap and to unwind the strap from the shaft means, manually applied force on the actuating portion of the ratchet lever in the direction of arrow 137 or 138, FIG. 2, disengages dog portion 126 from slots 122.

While inventive concepts have been disclosed herein in reference to a presently preferred and illustrative embodiment of the invention, it is contemplated that those concepts may be variously employed and embodied in alternate structure. It is intended that the appended claims be construed to cover alternative embodiments of the inventive concepts except insofar as precluded by the prior art.

What is claimed is:

1. In apparatus for fixedly securing one object relative to another object and comprising:
   an elongated continuous length strap means for being attached to the one object and for engaging and holding the other objects by tension;
   attachment means fixedly non-adjustably connected to opposite ends of said strap means for fixedly securing the opposite ends of said strap means relative to the other object;
   rotatable shaft means for winding and unwinding said strap means to adjustably tension said strap means;
   slot means in said shaft means having a sufficient width for slidably adjustably receiving and retaining an intermediate loop portion of said strap means for enabling adjustment of the effective length of said strap means by varying the length of said intermediate loop portion and for enabling portions of said effective length of said strap means next adjacent said rotatable shaft means and portions of said intermediate loop portion next adjacent said rotatable shaft means to be simultaneously wound and tensioned and unwound and untensioned by rotation of said rotatable shaft means;
   ratchet means operably engageable with said shaft means for releasably holding said shaft means against unwinding rotation during and after tensioning of said strap means;
   elongated operating handle means operably connected with said rotatable shaft means for causing rotation thereof;
   an elongated frame means having a pair of elongated spaced parallel side plate members having coaxial aligned bores for rotatably mounting said rotatable shaft means;
   said rotatable shaft means comprising a pair of elongated split shaft members extending between said side plate members and being spaced from one another to define said slot means and having opposite end portions extending through and rotatably supported in said coaxial aligned bores in side plate members;
   said ratchet means having a ratchet wheel member mounted on one juxtapositioned pair of said opposite end portions of said split shaft members and a pawl member mounted on the adjacent one of said side plate members;
   said elongated operating handle means comprising an elongated operating handle member slidably mounted on the other juxtapositioned pair of said opposite end portions of said split shaft members adjacent the other of said side plate members, the invention of assembly and mounting means for said shaft means and said ratchet means comprising:
   each of said shaft members having a segmental circular cross-sectional configuration of less than 180° with inner and outer arcuate peripheral surfaces extending between said side wall portions and through said coaxial aligned bores, the outer arcuate surfaces having a radius approximately equal to the radius of said coaxial aligned bores;
   a pair of circumferentially spaced arcuate slots in said ratchet wheel member having radii approximately equal to the radii of the arcuate inner and outer surfaces of said split shaft members and being coaxial therewith;
   a first end portion of each split shaft member being received in and confined and held in spaced relationship by one of said arcuate slots;
   radially extending flange means on said first end portion of each split shaft member axially adjacent said ratchet wheel member for limiting axial displacement of said split shaft members relative to said ratchet wheel member and for holding said ratchet wheel member on said split shaft members between said flange means and the adjacent side surface of one of the side plate members;
   a spacer means having a radially extending opening therein and being mounted between the opposite second end portions of said split shaft members for holding the opposite second end portions in uniformly spaced coaxial relationship with said arcuate slots and having a radial extending abutment surface for abutting engagement with the adjacent side surface of the other one of the side plate members to limit axial displacement of the split shaft assembly;
   said elongated handle member being slidably mounted in and extending through the aligned radially extending bores in the opposite end portions of said split shaft members and through said radially extending opening in said spacer means and limiting axial relative axial displacement between said spacer means and said split shaft members; and
   retaining means on opposite end portions of said handle member for preventing removal of said handle member from said aligned bores in said split shaft members.

2. The invention as defined in claim 1 and wherein said elongated frame means being made of one piece of formed sheet metal material.

3. The invention as defined in claim 2 and wherein said side plate members being connected by spaced transversely extending integral web portions defining a cavity therebetween aligned with said split shaft means.

4. The invention as defined in claim 1 and wherein said spacer means comprising:
- a polygonal member having opposite spaced parallel side surfaces engageable with the split shaft members and being spaced a distance approximately equal to the width of said slot means.

5. The invention as defined in claim 4 and wherein:
- said inner and outer arcuate surfaces of each of said split shaft members being connected by elongated axially extending connecting surfaces which are abuttingly engageable with one or the other of said opposite spaced parallel side surfaces of said spacer means.

6. The invention as defined in claim 5 and wherein said spacer means further comprising:
- pairs of opposite parallel peripheral surfaces extending laterally between said opposite spaced parallel side surfaces;
- one pair of said opposite parallel peripheral surfaces extending axially and being substantially aligned with and forming a continuation of the outer peripheral surfaces of said split shaft members; and
- the other pair of said opposite parallel peripheral surfaces extending radially between the outer peripheral surfaces of said split shaft members.

7. The invention as defined in claim 1 and wherein said pawl member comprising:
- an elongated member having a central pivotal connection to said one of said side wall members;
- a pawl portion extending over said ratchet wheel member and being engageable therewith;
- a spring attachment portion extending oppositely to said pawl portion; and
- a spring member having one end connected to said spring attachment portion and the opposite end connected to said one side wall member.

8. The invention as defined in claim 3 and further comprising:
- a belt guide pin means mounted between said side plate members at each end of said frame means above said web portions for guidably receiving said belt means.

9. The invention as defined in claim 7 and wherein said pawl member further comprising:
- a radially outermost tooth portion and a radially innermost tooth portion adapted to be located in a pair of adjacent slot portions of said ratchet wheel member in abutting engagement with an adjacent pair of said tooth portions on said ratchet wheel member and being spaced by a slot portion adapted to receive one of said adjacent pair of said tooth portions of said ratchet wheel member nearest said central pivotal connection of said pawl member.

10. The invention as defined in claim 7 and wherein:
- said pawl member having a bore means located in juxtaposition to a surface of the adjacent one of said side wall members in the engaged position relative to said ratchet wheel member for receiving a bolt preventing releasing movement of said pawl member relative to said ratchet wheel member.

11. The invention as defined in claim 9 and wherein said pawl member further comprising:
- an elongated cam surface located between said radially innermost tooth portion and said central pivotal connection and being engageable with the tooth portions of said ratchet wheel member during winding rotation of said rotatable shaft means to cause said pawl member to be cammed toward the disengaged position;
- said radially innermost tooth portion being engageable with said one of said adjacent pair of said tooth portions of said ratchet wheel member prior to engagement of said radially outermost tooth portion with the other one of said adjacent pair of said tooth portions on said ratchet wheel member during movement toward the engaged position; and
- mutually engageable surfaces on said radially innermost tooth portion and said one of said adjacent pair of said tooth portions on said ratchet wheel member enabling transfer of force from said ratchet wheel member to said pawl member in a direction tending to cause movement of said pawl member toward the engaged position.

* * * * *